June 9, 1942. H. A. WHEELER Re. 22,112

TELEVISION BROADCAST SYSTEM

Original Filed April 6, 1940 2 Sheets-Sheet 1

INVENTOR
HAROLD A. WHEELER
BY Harry B. Page
ATTORNEY

TELEVISION BROADCAST SYSTEM

Original Filed April 6, 1940 2 Sheets-Sheet 2

INVENTOR
HAROLD A. WHEELER
BY Harry D. Page
ATTORNEY

Reissued June 9, 1942

Re. 22,112

UNITED STATES PATENT OFFICE 22,112

TELEVISION BROADCAST SYSTEM

Harold A. Wheeler, Great Neck, N. Y., assignor to Hazeltine Corporation, a corporation of Delaware Original No. 2,271,322, dated January 27, 1942, Serial No. 328,351, April 6, 1940. Application for reissue March 3, 1942, Serial No. 433,244

16 Claims. (Cl. 178—6.8)

Figure 1:
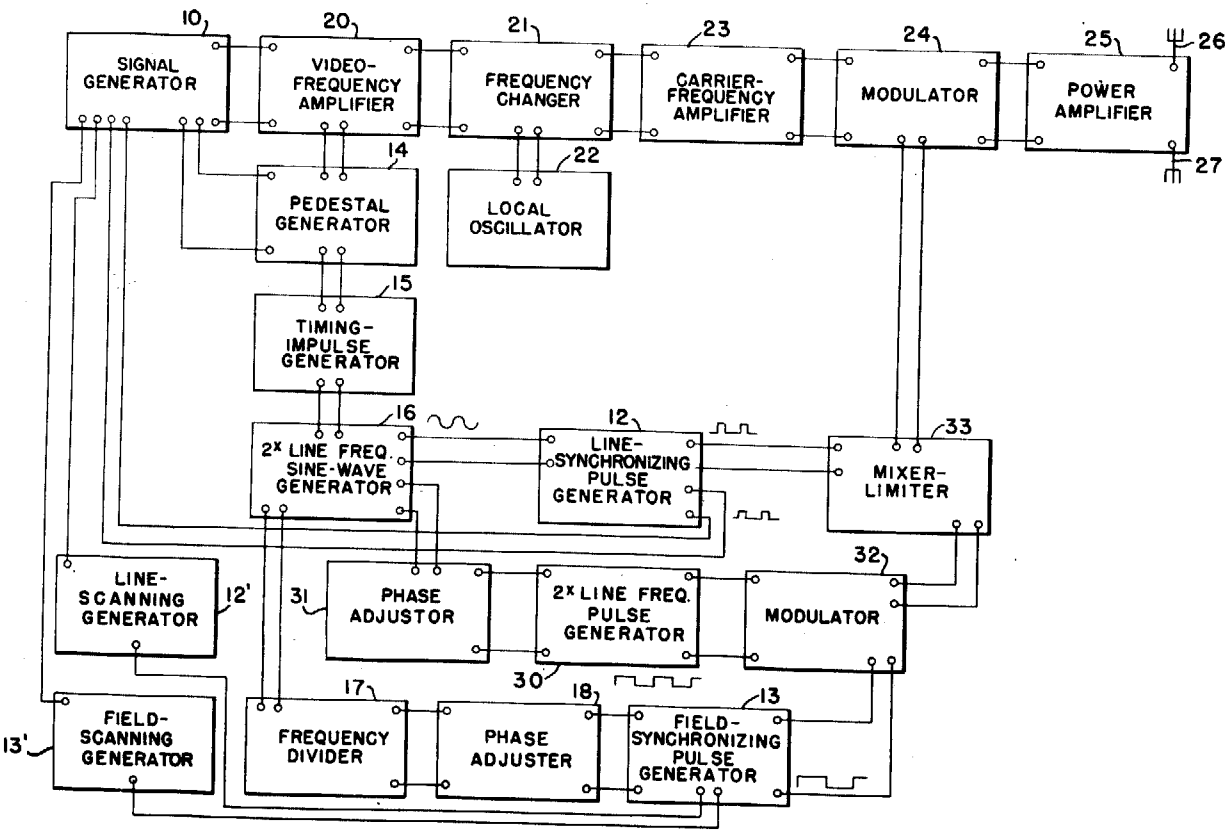

This invention relates to television broadcast systems and is particularly concerned with the provision of an improved type of television synchronizing signal together with transmitting apparatus and receiving apparatus for generating and utilizing such signal, respectively.

In accordance with present television practice, there is developed and transmitted a signal which comprises a carrier wave modulated during successive intervals or trace periods by video signals and during retrace intervals by the pulses of a composite synchronizing signal. At the receiver, it is necessary to provide an arrangement for utilizing certain of the transmitted synchronizing-signal pulses for synchronizing the line-scanning operation and for utilizing certain others of the transmitted synchronizing-signal pulses for synchronizing the field-scanning operation.

In general, it is desirable to supply to each of the scanning circuits of the receiver only synchronizing pulses of the particular type which are required to synchronize its scanning operation. Intersynchronizing signal-separating arrangements have, therefore, been used for separating the transmitted line-synchronizing and field-synchronizing pulses. Frequency-responsive means have been utilized for effecting the desired intersynchronizing signal separation. However, the composite synchronizing signal utilized in prior art systems has comprised field-synchronizing pulses having components of the line-scanning frequency of the system and line-synchronizing pulses having components other than those of the line-scanning frequency of the system or harmonic frequencies thereof. Therefore, such prior art frequency-responsive intersynchronizing signal-separating means have met their requirements only approximately or have been of a type, such as a differentiating or an integrating network, which is not the preferred type for some television installations.

For instance, a very simple type of prior art composite synchronizing signal comprises very narrow pulses repeated at the line-scanning frequency of the system and additional pulses inserted between certain successive line-synchronizing pulses at the field-scanning frequency for effecting field synchronization, the additional pulses having a width considerably greater than that of the line-synchronizing pulses but less than a line-scanning period, in order to prevent over-lapping any of the line-synchronizing pulses. Such field-synchronizing pulses have components of the line-scanning frequency and thus a television system utilizing such a composite synchronizing signal is subject to some of the above-mentioned disadvantages.

The composite synchronizing signal proposed as a standard by the Radio Manufacturers Association comprises field-synchronizing information which includes a modification of the line-synchronizing pulses as well as the introduction of interline broad pulses for field synchronization. The field-synchronizing information is so arranged that it includes components in the immediate vicinity of the line-scanning frequency and a system utilizing such a composite synchronizing signal is thus also subject to some of the above-mentioned disadvantages of other prior art arrangements.

A preferred type of frequency-responsive means for line-synchronizing pulses in a television receiver utilizes a resonant circuit sharply tuned to the fundamental frequency of the line-synchronizing pulses. Such a selector has the advantage that the complete obliteration of one or a few line-synchronizing pulses has little effect on the synchronization of the receiver, due to the fact that the free oscillations of the resonant circuit are effective to bridge the gap. A preferred type of frequency-responsive means for selecting field-synchronizing pulses in a television receiver utilizes a reflecting line, or the equivalent, which obliterates substantially all of the line-synchronizing pulses of the received composite synchronizing signal. Supplementally, there may be utilized with this type of field-synchronizing signal selector a low-pass filter for reducing the tendency of line-synchronizing pulses to cause interference without materially degrading the edges of the separated field-synchronizing pulses.

In order that the line-synchronizing and field-synchronizing pulses may be separated from each other by arrangements of the above-mentioned preferred types, two conditions must be met: first, the line-synchronizing pulses must contain components only of the line-scanning frequency of the system and at harmonics thereof, and, second, the field-synchronizing pulses must contain no components at the line-scanning frequency.

It is an object of the invention, therefore, to provide an improved television broadcast system which avoids one or more of the above-mentioned disadvantages of such systems of the prior art.

It is a further object of the invention to provide a television broadcast system which utilizes a composite synchronizing signal including line-synchronizing and field-synchronizing pulses, the line-synchronizing pulses of which contain components only of the line-scanning frequency of the system and harmonics thereof and the field-synchronizing pulses of which contain no components at the line-scanning frequency of the system.

It is a further object of the invention to provide an improved television transmitting system for developing and transmitting a composite synchronizing signal suitable for use in a television broadcast system of the type described.

It is still another object of the invention to provide a television receiving system adapted to receive a composite synchronizing signal utilized in a television broadcast system of the type under consideration.

In accordance with the invention, a television broadcast system comprises a station for developing and transmitting a modulated-carrier wave including means for developing a video signal, means for developing continuous line-synchronizing pulses, and means for developing a field-synchronizing signal consisting of one or more pairs of field-synchronizing pulses for each field, the pulses of each pair being displaced half the period of the line-synchronizing pulses, effectively having the same area, and having no part thereof coincident in duration with the line-synchronizing pulses. Preferably, the pulses of each of the said pairs are similarly shaped. Means are provided for modulating a carrier wave with the developed signals and pulses and for transmitting the resulting modulated carrier. A station is provided for receiving and reproducing the transmitted carrier wave including means for detecting and reproducing the video-frequency signal. Means are provided in the station, including a circuit sharply-selective to the fundamental frequency of the line-synchronizing pulses, for synchronizing the line scanning of the receiver, means are further provided for synchronizing the field scanning of the receiver, and means are provided for applying to each of the two last-named means the composite synchronizing-signal component of the received carrier signal. Preferably, the means for synchronizing the field scanning of the receiver includes a circuit selectively-responsive to the field-synchronizing signal and having a high attenuation at the fundamental and low harmonic frequencies of the line-synchronizing pulses.

Also in accordance with the invention, a television transmitting system comprises a station for developing and transmitting a modulated-carrier wave of the type under consideration and, further in accordance with the invention, a television receiving system is provided for receiving and reproducing a modulated-carrier wave of the type under consideration.

For a better understanding of the invention, together with other and further objects thereof, reference is had to the following description taken in connection with the accompanying drawings, and its scope will be pointed out in the appended claims.

Figure 5:
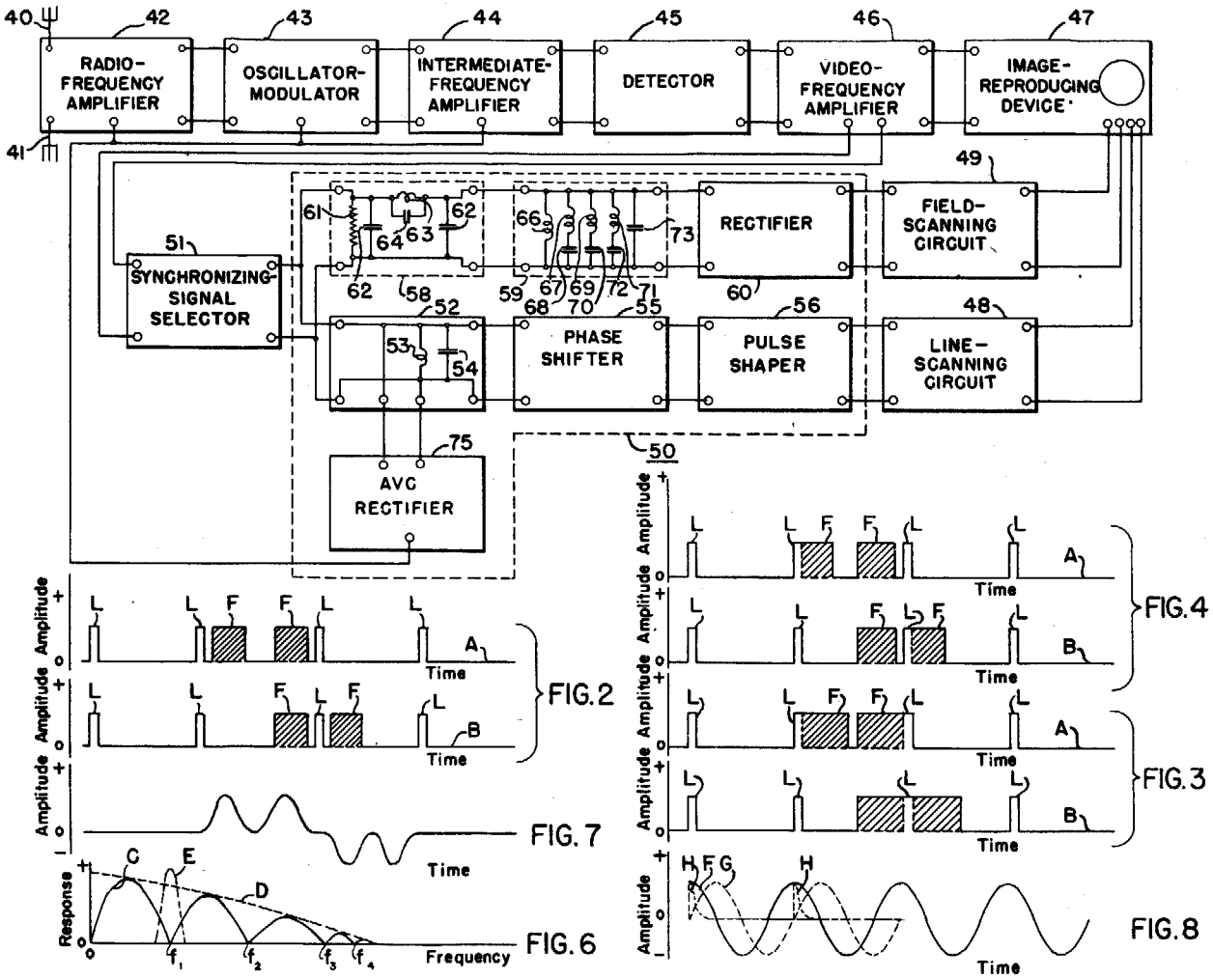

In the accompanying drawings, Figs. 1 and 5 are circuit diagrams, partly schematic, of complete television transmitting and receiving systems, respectively, embodying the present invention; Figs. 2, 3, and 4 are graphs illustrating composite synchronizing signals in accordance with the invention and are utilized to explain the operation of the circuits of Figs. 1 and 5; while Figs. 6, 7, and 8 comprise graphs illustrating characteristics utilized to explain the operation of the synchronizing-signal selective circuits of the receiver of Fig. 5.

Referring now more particularly to Fig. 1 of the drawings, there is represented a television transmitting system comprising a signal-generating device 10 of conventional design which may include a cathode-ray signal-generating tube having the usual electron gun and photosensitive target and line-scanning and field-scanning elements. The system also includes a line-synchronizing pulse generator 12 and a field-synchronizing pulse generator 13 having output circuits connected through line-scanning and field-scanning generators 12' and 13' to the line-scanning elements and field-scanning elements, respectively, of signal generator 10. In order to provide pedestal impulses for blocking out or for suppressing undesirable impulses in, and ensuring the proper wave form of, the modulation signal developed by the generator 10, there is provided a pedestal-impulse generator 14 having an output circuit coupled to a control element of signal generator 10. In order to synchronize the operations of the generators 12, 13, and 14 and the synchronizing signal-generating apparatus of the transmitter, there is provided a timing-impulse generator 15 effective to generate pulses at the line frequency and pulses at the field frequency of the system. Generator 15 has a double-line-scanning-frequency output circuit coupled to generator 12 through a sine-wave generator 16 of double-line-scanning frequency and to generator 13 through generator 16, a frequency divider 17, and a phase adjustor 18, and also has a line-scanning-frequency output circuit coupled directly to pedestal-impulse generator 14, as presently to be explained.

A video-frequency amplifier 20 is coupled to output circuits of signal generator 12 and pedestal generator 14. Connected in cascade to the output circuit of amplifier 20, in the order named, is a frequency changer 21 to which are coupled a local oscillator 22, a carrier-frequency amplifier 23, a modulator 24, by which the transmitted synchronizing signals are impressed on the generated signal, a power amplifier 25, and an antenna system 26, 27, as shown.

Neglecting for the moment the operation of the portions of the system of Fig. 1 constituting the present invention, the apparatus just described includes the elements of a television transmitting system of conventional design, the individual portions of the system being illustrated schematically since they may be of any well-known suitable construction so that a detailed description of the system and its operation is unnecessary herein. Briefly, however, the image of the scene to be transmitted is focused on the target of the signal generator 10 in which a scanning beam is focused upon the target. Scanning or deflection currents or voltages developed by the generators 12' and 13' are applied to the scanning elements of signal generator 10 and serve to deflect the beam to scan successive series or fields of parallel lines on the target. Pedestal impulses developed by the generator 14 are applied to the control element of the signal generator 10 to suppress or block out the scanning beam during certain portions, particularly the retrace portions, of the scanning cycles and are applied to the video-frequency amplifier 20 to suppress undesirable impulses developed in the system and to aid in obtaining the desired wave form of video-modulation signal.

The photosensitive elements of the target of signal generator 10 being electrically affected to an extent depending upon the varying values of light and shade at corresponding incremental areas of the image focused thereon, as the beam scans the target, a voltage of correspondingly varying amplitude is developed in the output circuit of the signal generator 10 and applied to the amplifier 20. Suitable timing or synchronizing impulses are applied from the generator 15 to the generators 12, 13, and 14 to maintain these generators in synchronism with either the master frequency, in the case of direct camera shots, or the motion picture camera, in case such pictures are being transmitted. The video-signal components applied to the amplifier 20 are amplified therein and thereupon applied to the frequency changer 21 wherein they are impressed upon the carrier wave generated by the oscillator 22. The modulated-carrier signal is translated from the frequency changer 21 by way of carrier-frequency amplifier 23 to the modulator 24, wherein the synchronizing-signal components are impressed on the carrier wave as will be presently explained. The resultant modulated-carrier wave is amplified in the power amplifier 25 and is impressed upon the antenna system 26, 27 for radiation.

Coming now to the portion of the system involving the present invention, there is provided a generator 30 for generating pulses having a predetermined wave form and a frequency double the frequency of the line-synchronizing pulses of the system and bearing a predetermined phase relationship thereto, the generator 30 being coupled through a phase adjustor 31 to generator 16 which, itself, generates a sine wave of double-line-scanning frequency. The signal outputs of generators 30 and 13 are combined in a modulator 32 having input circuits coupled to these generators, while the signal outputs of generators 12 and 32 are combined in mixer-limiter 33 having input circuits coupled to these generators. The output circuit of mixer-limiter 33 is coupled to modulator 24.

Reference is made to Fig. 2 for an explanation of the operation of the portion of the system of Fig. 1 constituting the present invention. Curve A of Fig. 2 illustrates a portion of the desired composite synchronizing signal of the system for one field in a double-interlaced scanning system, while curve B illustrates a corresponding portion of the desired composite synchronizing signal for a succeeding field. The narrow pulses L represent line-synchronizing pulses of the system while the broad shaded pulses F represent field-synchronizing signals. The pulses L and F are so proportioned and related, as appears from curves A and B, that the composite synchronizing signal includes a pair of similarly-shaped field-synchronizing pulses for each field displaced half the period of the line-synchronizing pulses of the system and having no part thereof coincident in duration with the line-synchronizing pulses. Furthermore, it will be seen that the line-synchronizing pulses are continuous; that is, the line-synchronizing pulses are not interrupted or modified during the field-synchronizing interval of the system. In the composite synchronizing signals illustrated by curves A and B, the line-synchronizing pulses contain components only of the line-scanning frequency of the system and harmonics thereof, while the field-synchronizing pulses contain no components at the line frequency of the system, since the successive pulses F are displaced 180 degrees at the line-scanning frequency and, therefore, have no energy at such frequency. It will be understood that a composite synchronizing signal of this type is developed in mixer-limiter 33 and utilized to modulate the carrier signal in modulator 24 for transmission. Furthermore, it will be understood that, while the pulses F, F have been illustrated as similarly shaped, some of the advantages of the invention will be obtained if they are not similarly shaped but have effectively the same area.

In order to develop the line-synchronizing signals L of the type illustrated, a sine-wave oscillation having a frequency double the line-scanning frequency is developed by generator 16 and utilized to synchronize the line-synchronizing pulse generator 12 which is synchronized at one-half the frequency of generator 16 and which develops the desired line-synchronizing pulses at line-scanning frequency. In order to insert the pair of field-synchronizing pulses F, F into the composite synchronizing signal, a continuous periodic-pulse wave having a frequency double the line-scanning frequency and a wave form and pulse duration equal to those of pulses F is generated by generator 30 synchronized by generator 16 through the phase adjustor 31. The pulses generated by generator 30 have a duration less than one-half the line-scanning period of the system, but long compared to the duration of the line-synchronizing pulses. In order to key desired pulses from the signal output of pulse generator 30 into the circuit of mixer-limiter 33 for insertion into the composite synchronizing signal, the signal output of generator 30 is applied to modulator 32 and a keying signal at field-scanning frequency is also supplied to modulator 32 from the field-synchronizing pulse generator 13. The keying signal is a periodic-pulse wave at field-scanning frequency, the pulses of which have a duration of approximately one line-scanning period and the phase of which is accurately controlled with respect to the generated line-synchronizing pulses by phase adjustor 18 excited from generator 16 through frequency divider 17.

In summary, therefore, it will be seen that line-synchronizing pulses L, as illustrated in Fig. 2, are derived from generator 12 and that a continuous wave, of which the pulses F, F may be considered as two pulse components, is generated in unit 30. The desired field-synchronizing pulses F, F are selected by modulator 32 which is keyed at the field-scanning frequency of the system by generator 13. Thereafter, the selected field-synchronizing pulses F, F from modulator 32 and the line pulses from generator 12 are combined in mixer-limiter 33 and utilized in modulator 24 to modulate the carrier signal of the system. It will be understood that the duration of the pulses F of Fig. 2 is not critical so long as they do not over-lap each other or overlap any of the line-synchronizing pulses of the system. The television broadcast system, therefore, comprises the station for developing and transmitting a modulated-carrier wave including, a signal generator 10 for developing a video signal, line-synchronizing pulse generator 12 for developing continuous line-synchronizing pulses, units 13, 30, and 32 for developing a field-synchronizing signal consisting of one or more pairs of pulses for each field displaced half the period of the line-synchronizing pulses and effectively having the same area and having no part thereof coincident in duration with the line-synchronizing pulses, and modulator 24 for modulating a carrier wave with the developed signals and pulses for transmission.

While the transmitter of Fig. 1 has been described as generating a composite synchronizing signal as illustrated by curves A and B of Fig. 2, it will be understood that with proper control of the duration of the field-synchronizing pulses and the phase thereof with respect to the line-synchronizing pulses, a modified form of composite synchronizing signal, for example, as illustrated by corresponding curves of Fig. 3 or Fig. 4, can be generated and utilized. In the composite synchronizing signals of Figs. 3 and 4, the field-synchronizing pulses F, F are still displaced by one-half the line-scanning period but are contiguous with certain of the line-synchronizing pulses, although they do not over-lap such pulses. In other words, the composite synchronizing signal illustrated by any of Figs. 2, 3, and 4 comprises continuous line-synchronizing pulses and a field-synchronizing signal consisting of a pair of similarly-shaped field-synchronizing pulses for each field displaced half the period of the line-synchronizing pulses and having no part thereof coincident in duration with the line-synchronizing pulses. Also, in each case, the pair of field-synchronizing pulses for one field is effectively included between two successive line-synchronizing pulses and the pair of field-synchronizing pulses for the succeeding field is separated by the duration of a line-synchronizing pulse. Further, if desired, more than one pair of field-synchronizing pulses F, F per field may be utilized, it only being necessary that the number of such pulses be even and that each pair be displaced by one-half the line-scanning period so that the resultant signal contains no energy at the line-scanning frequency.

Referring now to Fig. 5, the system there represented comprises a television receiver of the superheterodyne type for receiving and reproducing a television signal in accordance with the present invention. This receiver includes an antenna system 40, 41 to which there are connected in cascade, in the order named, a radio-frequency amplifier 42, a frequency changer or oscillator-modulator 43, an intermediate-frequency amplifier 44, a detector 45, a video-frequency amplifier 46, and an image-reproducing device 47. A line-scanning circuit 48 and a field-scanning circuit 49 are also coupled to the output circuit of video-frequency amplifier 46 by way of a synchronizing-signal selector 51 and inter-synchronizing signal-separating apparatus 50 embodying the present invention and hereinafter described in detail. The circuits 48 and 49 are coupled to the scanning elements of the image-reproducing device 47 in a conventional manner. The circuits or elements 40—49, inclusive, and 51 may all be of any conventional well-known construction, so that detailed illustrations and descriptions thereof are unnecessary herein.

Referring briefly to the general operation of the receiving system, television signals are selected by the antenna system 40, 41, amplified in the radio-frequency amplifier 42, and converted into intermediate-frequency signals in the oscillator-modulator 43, the intermediate-frequency signals being, in turn, selectively amplified in the intermediate-frequency amplifier 44 and delivered to the detector 45. The video-modulation components of the signal are developed by the detector 45 and are supplied to the video-frequency amplifier 46 wherein they are amplified and from which they are supplied in the usual manner to a brilliancy-control electrode of the image-reproducing device 47. The intensity of the scanning beam of the image-reproducing device 47 is thus modulated or controlled in accordance with the video-frequency voltages impressed upon the control electrode of the tube in the usual manner. The video-frequency signal is also applied from the amplifier 46 through synchronizing-signal separator 51 to the apparatus 50 wherein automatic amplification control or A. V. C. potentials are developed in accordance with the present invention and applied to the control electrodes of one or more of the tubes of units 42, 43, and 44 and wherein the line-synchronizing and field-synchronizing components are effectively separated from each other and applied to the scanning circuits 48 and 49, as will be hereinafter further explained. Saw-tooth current or voltage scanning waves are developed by the line-scanning and field-scanning circuits 48 and 49 and applied to the scanning elements of image-reproducing device 47 to produce electric scanning fields, thereby to deflect the intensity-modulated scanning beam in two directions normal to each other to trace successive fields of parallel lines on the target of the tube to reconstruct the transmitted image.

Coming now to the portion of the receiver of Fig. 5 constituting the present invention, there is provided in unit 50 means for effectively separating the transmitted field-synchronizing pulses from all other components, means for effectively separating the transmitted line-synchronizing pulses from all other components, and means for developing an A. V. C. bias for controlling the amplification of the received signal inversely in accordance with the received amplitude thereof. As stated above, the preferred type of frequency selection for the line-synchronizing pulses is a resonant circuit sharply-tuned to the line-scanning frequency. This has the advantage that the complete obliteration of one or a few line-synchronizing pulses has little effect on the synchronizing of the scanning circuits, the free oscillation of the resonant circuit bridging the gap. Accordingly, there is provided in unit 50 a selector 52 including a single sharply-tuned or low power factor parallel-resonant circuit 53, 54. The line-scanning circuit 48 is coupled to the selector 52 through a phase shifter 55 and a pulse shaper 56.

Also, as stated above, the preferred selection of field-synchronizing pulses is by the use of a reflecting line or equivalent network which obliterates substantially all of the line-synchronizing pulses and leaves the field-synchronizing pulses substantially undegraded and with fairly steep edges. Such a network may be supplemented by a low-pass filter to reduce the tendency for interference from the line-synchronizing pulses without materially degrading the edges of the separated field-frequency pulses. Accordingly, there is coupled to synchronizing-signal selector 51 a unit 58 which includes the elements of a low-pass filter and a unit 59 which includes elements which are the substantial equivalent of a reflecting line. The low-pass filter network 58 includes a terminating resistor 61 across its input terminals, shunt-capacitance arms 62, 62, and an interposed series arm including a parallel-resonant circuit 63, 64. The network 59 comprises an inductor 66 in parallel with three series-resonant circuits 67, 68, 69, 70, and 71, 72. A shunt condenser 73 is also coupled in parallel with these resonant circuits. Field-scanning circuit 49 is coupled to unit 59 through a rectifier 60.

An A. V. C. rectifier 75, which may be of conventional design, but which preferably includes a load circuit having a time constant which is short relative to the period of the field-synchronizing pulses to provide a fast-acting automatic amplification control system, is coupled across tuned circuit 53, 54 and has its output applied to one or more of the tubes in the stages 42, 43, and 44 in order to maintain the signal input to detector 45 within a relatively narrow range for a wide range of received signal intensities.

Coming now to an explanation of the portion 50 of the receiver which constitutes the essence of the present invention, it is seen that synchronizing-signal selector 51 comprises means for applying to the unit 50 the composite synchronizing-signal component of a received carrier signal and reference is made to Fig. 6 wherein are shown certain of the response characteristics of the recevier circuit. Solid-line curve C illustrates the response characteristic of the unit 59, which is the substantial equivalent of a reflecting filter, as supplemented by the action of the unit 58. The characteristic of the low-pass filter of unit 58 alone is illustrated by dashed-line curve D, while the sharply-selective response characteristic of tuned circuit 53, 54, which is resonant at the frequency of the line-synchronizing pulses, is illustrated by the dotted-line curve E. The frequency scale of the graph of Fig. 6 is divided into multiples of the line-scanning frequency $f_1$. It is noted that the reflecting filter, having the characteristic C, effectively suppresses or infinitely attenuates components of frequencies equal to all multiples of the line-scanning frequency; that is, the circuit provides a high attenuation at the fundamental and predetermined harmonic frequencies of the line-synchronizing pulses. This action is procured in the circuit of Fig. 5 by proportioning circuit 67, 68 to be resonant at the frequency $f_1$, proportioning circuit 69, 70 to be resonant at the frequency $f_2$, proportioning circuit 71, 72 to be resonant at the frequency $f_3$, while a trap at the frequency $f_4$ is effectively provided by the tuned circuit 63, 64 included in the series arm of low-pass filter network 58. This circuit arrangement is then effective to provide a high attenuation at zero frequency, the fundamental frequency, the second harmonic and the third harmonic frequencies of the line-synchronizing pulses and, obviously, the pass band of the filter network 58 may be widened and a correspondingly greater number of series-resonant traps may be included in the network 59 if it is desired to increase the fidelity of translation of the field-synchronizing pulses.

In Fig. 7, there is illustrated the signal output of unit 59 in response to an input composite synchronizing signal of curve A of Fig. 2, the line-synchronizing pulses being effectively suppressed or infinitely attentuated. While the system produces inverted images of the field-synchronizing pulses, these occur at such a time that they do not interfere with the field-synchronizing operation of the receiver.

In Fig. 8, there are illustrated the signal output characteristics of the line-synchronizing pulse selector 52, phase shifter 55, and pulse shaper 56 of the receiver of Fig. 5. The solid-line curve F represents the sine-wave voltage developed across the resonant circuit 53, 54 while the dotted-line curve G represents the voltage which is developed at the output circuit of phase shifter 55. The phase shifter 55 is effective to provide a sine-wave output which is shifted in phase with respect to the voltage of curve F so that its zero-axis intercepts coincide with the leading edge of the line-synchronizing pulses L. The dotted lines H of Fig. 8 illustrate a series of sharp pulses which are derived from the displaced sine wave G and which are exactly timed with the leading edge of the line-synchronizing pulses L. The pulse shaper 56 for deriving such narrow pulses H from the sine-wave output G of phase shifter 55 may be of conventional design. In fact, the phase shifter 55, pulse shaper 56, and the line-scanning circuit 48 may comprise elements in accordance with those shown in U. S. Patent No. 2,251,929, issued Aug. 12, 1941, to Freeman and Blaisdell. Specifically, phase shifter 55 may comprise a tuned circuit inductively coupled to tuned circuit 53, 54 thus corresponding to the tuned circuit 25, 26 of the above-mentioned United States patent. Pulse shaper 56 may comprise a diode rectifier, corresponding to the diode rectifier 50 of the said United States patent, coupled in series with an inductance across the phase shifter 55 to which is coupled a multigrid output tube, corresponding to the tube 50 of the said United States patent, for supplying the developed line-synchronizing pulses to the line-scanning circuit 48 for synchronizing a scanning oscillator therein. Since none of the composite synchronizing signals represented in Figs. 2, 3, and 4 contains any energy in the field-synchronizing components at the line-scanning frequency, the line-synchronizing pulses derived from the selector 52 are unaffected by such field-synchronizing components. At the same time, these output pulses are substantially free from transient disturbances and noise and will persist even though one or more of the line-synchronizing input pulses may be obliterated, due to the fly-wheel or energy-storage properties of the resonant circuit 53, 54.

The line-synchronizing signal input to the A. V. C. rectifier 75 is of such a nature as to permit the use of a short time-constant load circuit in the A. V. C. rectifier circuit, thereby to provide a fast-acting A. V. C., which is of decided advantage in avoiding the paralyzing effects of large amplitude noise disturbances on long time-constant A. V. C. circuits. This advantage is incidental to the use of the method provided for selecting the line-synchronizing pulses without disturbance from the field-synchronizing pulses, since, otherwise, the time constant of the A. V. C. rectifier load circuit must be sufficiently large to filter out such field-scanning frequency components. The type of synchronizing signal provided by the invention thus makes possible the utilization of this type of fast-acting automatic amplification control circuit with its full advantages.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A television broadcast system comprising, a station for developing and transmitting a modulated-carrier wave including means for developing a video signal, means for developing continuous line-synchronizing pulses, means for developing a field-synchronizing signal consisting of one or more pairs of pulses for each field displaced half the period of said line-synchronizing pulses and effectively having the same area and having no part thereof coincident in duration with said line-synchronizing pulses, means for modulating a carrier wave with said developed signals and pulses for transmission, a station for receiving and reproducing said carrier wave including means for detecting and reproducing said video signal, means including a circuit sharply-selective to the fundamental frequency of said line-synchronizing pulses for synchronizing the line scanning of said receiver, means for synchronizing the field scanning of said receiver, and means for applying to each of said two last-named means the composite synchronizing-signal component of a received carrier signal.

2. A television broadcast system comprising, a station for developing and transmitting a modulated-carrier wave including means for developing a video signal, means for developing continuous line-synchronizing pulses, means for developing a field-synchronizing signal consisting of one or more pairs of pulses for each field displaced half the period of said line-synchronizing pulses and effectively having the same area and having no part thereof coincident in duration with said line-synchronizing pulses, means for modulating a carrier wave with said developed signals and pulses for transmission, a station for receiving and reproducing said carrier wave including means for detecting and reproducing said video signal, means including a circuit sharply-selective to the fundamental frequency of said line-synchronizing pulses for synchronizing the line scanning of said receiver, means including a circuit selectively-responsive to said field-synchronizing signal and having a high attenuation at the fundamental and predetermined low harmonic frequencies of said line-synchronizing pulses for synchronizing the field scanning of said receiver, and means for applying to each of said two last-named means the composite synchronizing-signal component of a received carrier signal.

3. A television broadcast system comprising, a station for developing and transmitting a modulated-carrier wave including means for developing a video signal, means for developing continuous line-synchronizing pulses, means for developing a field-synchronizing signal consisting of one or more pairs of similarly-shaped field-synchronizing pulses for each field displaced half a period of said line-synchronizing pulses and having no part thereof coincident in duration with said line-synchronizing pulses, means for modulating a carrier wave with said developed signals and pulses for transmission, a station for receiving and reproducing said carrier wave including means for detecting and reproducing said video signal, means including a circuit sharply-selective to the fundamental frequency of said line-synchronizing pulses for synchronizing the line scanning of said receiver, means for synchronizing the field scanning of said receiver, and means for applying to each of said two last-named means the composite synchronizing-signal component of a received carrier signal.

4. A television receiving system for receiving and reproducing a modulated-carrier wave including as modulation components a video signal, continuous line-synchronizing pulses and a field-synchronizing signal consisting of one or more pairs of field-synchronizing pulses for each field displaced half a period of said line-synchronizing pulses and effectively having the same area and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means for synchronizing the field scanning of said receiver, and means for applying to each of said two last-named means the composite synchronizing-signal component of a received carrier signal.

5. A television receiving system for receiving and reproducing a modulated-carrier wave including as modulation components a video signal, continuous line-synchronizing pulses and a field-synchronizing signal consisting of one or more pairs of field-synchronizing pulses for each field displaced half a period of said line-synchronizing pulses and effectively having the same area and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means including a circuit selectively-responsive to said field-synchronizing signal and having a high attenuation at the fundamental and predetermined low harmonic frequencies of said line-synchronizing pulses for synchronizing the field scanning of said receiver, and means for applying to each of said two last-named means the composite synchronizing-signal component of a received carrier signal.

6. A television receiving system for receiving and reproducing a modulated-carrier wave including as modulation components a video signal, continuous line-synchronizing pulses, and a field-synchronizing signal consisting of one or more pairs of similarly-shaped field-synchronizing pulses for each field displaced half a period of said line-synchronizing pulses and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means for synchronizing the field scanning of said receiver, and means for applying to each of said two last-named means the composite synchronizing-signal component of a received carrier signal.

7. A television receiving system for receiving and reproducing a modulated-carrier wave including as modulation components a video signal, continuous line-synchronizing pulses and a field-synchronizing signal consisting of one or more pairs of field-synchronizing pulses for each field displaced half a period of said line-synchronizing pulses and effectively having the same area and having no part thereof coincident in duration with said line-synchronizing pulses comprising, means for detecting and reproducing said video signal, means including a low power factor parallel-resonant circuit sharply-selective to the fundamental frequency of said line-synchronizing pulses for synchronizing the line scanning of said receiver, means for synchronizing the field scanning of said receiver, and means for applying to each of said two last-named means the composite synchronizing-signal component of a received carrier signal.

8. A television receiving system for receiving and reproducing a modulated-carrier wave including as modulation components a video signal, continuous line-synchronizing pulses and a field-synchronizing signal consisting of one or more pairs of field pulses for each field displaced half a period of said line-synchronizing pulses and effectively having the same area and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means effectively including in cascade a low-pass filter and a circuit selectively responsive to said field-synchronizing signal and having high attenuation at the fundamental and predetermined low harmonic frequencies of said line-synchronizing pulses for synchronizing the field scanning of said receiver, and means for applying to each of said two last-named means the composite synchronizing-signal component of a received carrier signal.

9. A television receiving system for receiving and reproducing a modulated-carrier wave including as modulation components a video signal, continuous line-synchronizing pulses and a field-synchronizing signal consisting of one or more pairs of field-synchronizing pulses for each field displaced half a period of said line-synchronizing pulses and effectively having the same area and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means including a circuit selectively responsive to said field-synchronizing signal and having a high attenuation at zero frequency, the fundamental frequency, the second harmonic and the third harmonic frequencies of said line-synchronizing pulses for synchronizing the field scanning of said receiver, and means for applying to each of said two last-named means the composite synchronizing-signal component of a received carrier signal.

10. A television receiving system for receiving and reproducing a modulated-carrier wave including as modulation components a video signal, continuous line-synchronizing pulses and a field-synchronizing signal consisting of one or more pairs of field-synchronizing pulses for each field displaced half a period of said line-synchronizing pulses and effectively having the same area and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means for synchronizing the field scanning of said receiver, means for applying to each of said two last-named means the composite synchronizing-signal component of a received carrier signal, and means including a fast-acting automatic amplification control rectifier circuit responsive to the output of said sharply-selective circuit for controlling the amplification of said receiver inversely in accordance with received signal intensities.

11. A television receiving system for receiving and reproducing a modulated-carrier wave including as modulation components a video signal, continuous line-synchronizing pulses and a field-synchronizing signal consisting of one or more pairs of similarly-shaped field-synchronizing pulses for each field displaced half a period of said line-synchronizing pulses and effectively having the same area and having no part thereof coincident in duration with said line-synchronizing pulses comprising, means for detecting and reproducing said video signal, means including a circuit sharply-selective to the fundamental frequency of said line-synchronizing pulses for synchronizing the line scanning of said receiver, means for synchronizing the field scanning of said receiver, means for applying to each of said two last-named means the composite synchronizing-signal component of a received carrier signal, and rectifier means responsive to the signal output of said sharply-selective circuit and provided with a load circuit having a time constant which is short relative to the period of said field-synchronizing pulses for controlling the amplification of said receiver inversely in accordance with received signal intensities.

12. A television transmitting system comprising, a station for developing and transmitting a modulated-carrier wave including means for developing a video signal, means for developing continuous line-synchronizing pulses, means for developing a field-synchronizing signal consisting of one or more pairs of field-synchronizing pulses for each field displaced half a period of said line-synchronizing pulses and effectively having the same area and having no part thereof coincident in duration with said line-synchronizing pulses, and means for modulating a carrier wave with said developed signals and pulses for transmission.

13. A television transmitting system comprising, a station for developing and transmitting a modulated-carrier wave including means for developing a video signal, means for developing continuous line-synchronizing pulses, means for developing a field-synchronizing signal consisting of one or more pairs of similarly-shaped field-synchronizing pulses for each field displaced half a period of said line-synchronizing pulses and having no part thereof coincident in duration with said line-synchronizing pulses, and means for modulating a carrier wave with said developed signals and pulses for transmission.

14. A television transmitting system comprising, a station for developing and transmitting a modulated-carrier wave including means for developing a video signal, means for developing continuous line-synchronizing pulses, means for developing a field-synchronizing signal consisting of a pair of field-synchronizing pulses for each field displaced half a period of the line-synchronizing pulses and effectively having the same area and having no part thereof coincident in duration with said line-synchronizing pulses, said field-synchronizing pulses having a duration less than one-half the line-scanning period of said system but long compared to the duration of said line-synchronizing pulses, and means for modulating a carrier wave with said developed signals and pulses for transmission.

15. A television transmitting system comprising, a station for developing and transmitting a modulated-carrier wave including means for developing a video signal, means for developing continuous line-synchronizing pulses, means for developing a periodic-pulse wave having a frequency twice that of said line-synchronizing pulses, means for selecting predetermined ones of the pulses of said periodic wave for developing a field-synchronizing signal consisting of one or more pairs of similarly-shaped field-synchronizing pulses for each field displaced half a period of said line-synchronizing pulses and having no part thereof coincident in duration with said line-synchronizing pulses, and means for modulating a carrier wave with said developed signals and pulses for transmission.

16. A television transmitting system comprising, a station for developing and transmitting a modulated-carrier wave including means for developing a video signal, means for developing continuous line-synchronizing pulses, means for developing a double-interlaced field-synchronizing signal consisting of one or more pairs of similarly-shaped field-synchronizing pulses for each field displaced half a period of said line-synchronizing pulses and having no part thereof coincident in duration with said line-synchronizing pulses, the pair of field pulses for one field being effectively included between two successive line-synchronizing pulses and the pair of field-synchronizing pulses for the succeeding field being separated by the duration of a line-synchronizing pulse, and means for modulating a carrier wave with said developed signals and pulses for transmission.

HAROLD A. WHEELER.